US012739184B2

(12) United States Patent
Epperson

(10) Patent No.: US 12,739,184 B2
(45) Date of Patent: Sep. 15, 2026

(54) APPLICATION-FOCUSED NETWORK OBSERVABILITY

(71) Applicant: The PNC Financial Services Group, Inc., Pittsburgh, PA (US)

(72) Inventor: Brandon H. Epperson, Summerville, SC (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 47 days.

(21) Appl. No.: 18/888,851

(22) Filed: Sep. 18, 2024

(65) Prior Publication Data

US 2026/0081854 A1 Mar. 19, 2026

(51) Int. Cl.
*H04L 43/0811* (2022.01)
*H04L 43/04* (2022.01)
*H04L 43/10* (2022.01)

(52) U.S. Cl.
CPC .......... *H04L 43/0811* (2013.01); *H04L 43/04* (2013.01); *H04L 43/10* (2013.01)

(58) Field of Classification Search
CPC ....... H04L 43/0811; H04L 43/04; H04L 43/10
See application file for complete search history.

(56) References Cited

U.S. PATENT DOCUMENTS 7,804,787 B2 9/2010 Brandyburg
8,499,204 B2 7/2013 Lovy
9,509,524 B2 11/2016 Lewis
10,178,067 B1 1/2019 Kumar
10,367,711 B2 * 7/2019 Desai ...................... H04L 43/20
10,594,576 B2 3/2020 Cavuto
10,841,365 B2 11/2020 White
10,938,696 B2 3/2021 Kotadia
10,944,654 B2 3/2021 Rimar
11,121,947 B2 9/2021 Narayan
11,190,422 B2 11/2021 Cavuto
11,394,628 B1 7/2022 Chakkassery Vidyadharan
12,355,613 B1 * 7/2025 Kalintsev ............ H04L 41/0659
2019/0034254 A1 1/2019 Nataraj
2021/0152455 A1 * 5/2021 Castle ................. H04L 43/0876
2021/0409294 A1 * 12/2021 Chitalia ............ G06F 16/24568
2024/0291835 A1 * 8/2024 Sethi ................... H04L 63/1425

FOREIGN PATENT DOCUMENTS

CN 105282772 B2 6/2018
JP 6655533 B2 2/2020
WO 2002059798 A1 8/2002

* cited by examiner

*Primary Examiner* — David R Lazaro
(74) *Attorney, Agent, or Firm* — K&L Gates LLP

(57) ABSTRACT

Systems and methods monitor the reachability status of network components for an application hosted on a computer network. A server system provides a user interface to a user device where the user inputs an application identifier. The server queries a database to retrieve identification data for network components supporting the application and then queries another database for their status information. The server determines the reachability status of each component and the application itself. Finally, the server generates an updated user interface with the status information for each network component and the application's overall reachability status.

20 Claims, 6 Drawing Sheets

APPLICATION-FOCUSED NETWORK OBSERVABILITY

BACKGROUND

A computer network for an organization often hosts applications for the organization across numerous physical and virtual infrastructure components, such as hosts, servers, switches, virtual machines, etc. Any one application running on a data center network may be supported by numerous infrastructure components within the organization's network. Further, any one infrastructure component of the network may support numerous applications. As such, the operating status of any one infrastructure component of the network could have an effect on multiple applications for the organization. For example, if a host hosting multiple applications fails, it can affect all of the applications that it hosts, which can impair critical operations of the organization.

SUMMARY

In one general aspect, the present invention is directed to computer-implemented systems and methods for application-focused network observability. An organization can use the systems and method of the present invention to, for example, check the status, such as the reachability status, of the network components in the organization's computer network that support the organization's various software applications. In various embodiments, a user device inputs an identifier for an application to be monitored in a user interface, such as web-based user interface. The server system queries a database to determine, based on the received application identifier, identification data for each network component supporting the requested application. The server system can then query another database using the identification data for each network component supporting the requested application to retrieve status information for each of the network components. The server system can determine a reachability status of each network component supporting the requested application based on the retrieved status information. The server system can generate and serve to the user device another (or updated) user interface comprising the status information for each network component supporting the requested application and a reachability status for each network component and/or the requested application. The status of the information of the network components can be collected via push or pull scenarios. Embodiments of the present invention, therefore, allow, for example, support teams to assess the status of its organization's network components on an application level, as opposed to at a component level. This type of application-level observability can be valuable because the network components that support an application can vary over time. These and other benefits will be apparent from the description that follows.

FIGURES

Unless specified otherwise, the accompanying drawings illustrate aspects of the innovations described herein. Referring to the drawings, where, unless otherwise noted, like numerals refer to like parts throughout several views and this specification, several embodiments of presently disclosed principles are illustrated by way of example, and not by way of limitation. The drawings are not intended to be to scale. A more complete understanding of the disclosure may be realized by reference to the accompanying drawings in which.

DESCRIPTION

Figure 1:
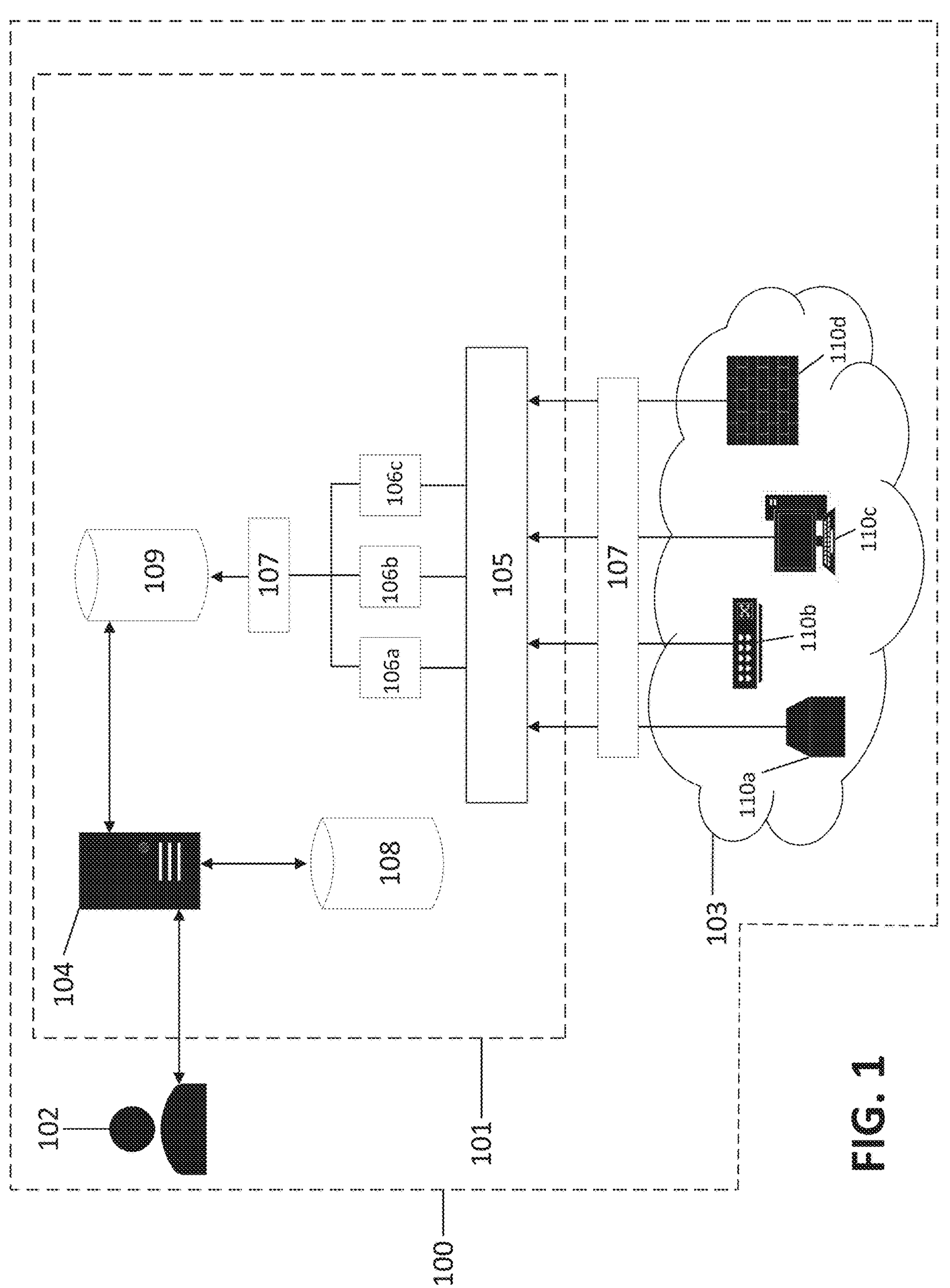
FIG. 1 is a diagram of a system for network-focused observability, according to various embodiments of the present invention.

The present invention relates, in one general aspect, to application-focused network observability of individual network infrastructure components. A company, enterprise or organization can use embodiments of the present invention to monitor the infrastructure components of its computer network that host the organization's applications. In general, a system according to the present invention can comprise a computer network and a back-end application monitoring system for monitoring, for example, a reachability status of network components for each application hosted by the computer network. The computer network can comprise a plurality of network infrastructure components, such as network switches, hosts, servers, firewalls, etc., that support the applications hosted by the computer network. The back-end application monitoring system is configured to serve a digital user interface to a user device via an electronic data network (e.g., a web-based user interface). Via the interface, the back-end application monitoring system can receive, from a user, an application identifier for an application for which the user wants to receive observability status information. The back-end application monitoring system can determine, in real-time or near real-time, the reachability status of network infrastructure components for the requested application by looking up in a database the network infrastructure components that support the requested application. Then, in one embodiment, the back-end application monitoring system can determine the status of those components by pinging them (e.g., a pull scenario) and collecting their collective responses to the pings. In another embodiment, the network components periodically report their status information to a database (e.g., a push scenario), in which case the back-end application monitoring system can query the database to determine the status of the application's network components. Under either scenario, the back-end application monitoring system can generate a user interface to serve to the user, where the user interface captures and reports the status of the application's network components.

The present invention, in various embodiments, can, therefore, provide support teams for an organization that are supporting the organization's network with insights regarding which network components are supporting which applications hosted by the network. Embodiments of the present invention can allow the support teams to quickly identify all of the components of the network that are supporting a given application, which allows the support teams to quickly identify which applications hosted by the network are impacted during a critical incident, such as the failure of a network component. Further, embodiments of the present invention can provide the support teams with the ability to determine and analyze potential impacts to applications hosted by the network that would occur as a result of a change to the network infrastructure and/or an application hosted on the network.

Figure 2:
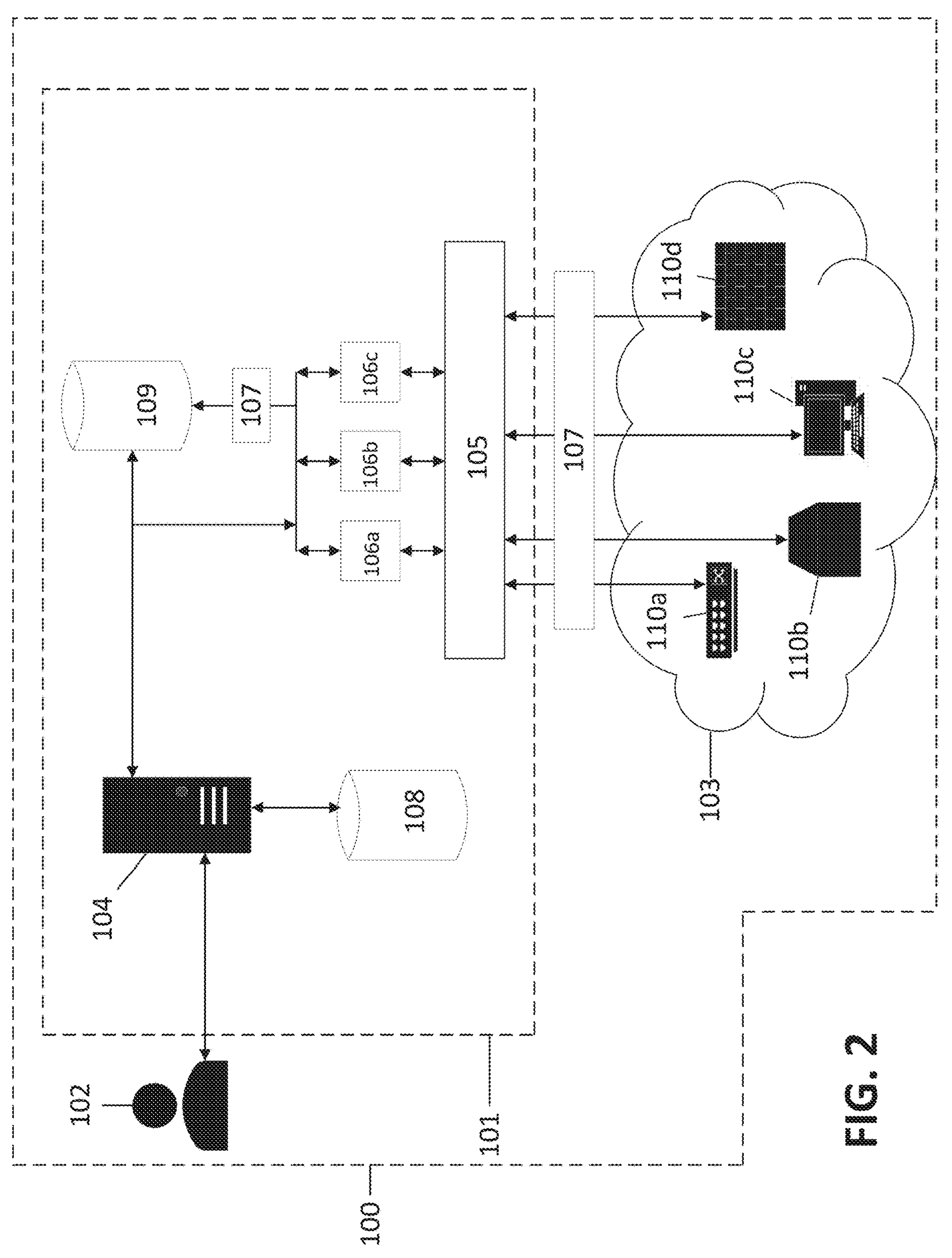
FIG. 2 is a diagram of a system for network-focused observability, according to various embodiments of the present invention.

With reference now to the figures, FIGS. 1 and 2 depict a system 100 for application-focused network observability, according to various embodiments of the present invention. The system 100 can comprise, as shown in the example of FIGS. 1 and 2, a computer network 103 and a back-end application monitoring system 101. In some embodiments, the computer network 103 can be an organization's on-premises and/or private cloud network, and can comprise one or more network components, such as the one or more network components that support one or more applications hosted by the network. According to various embodiments, the one or more network components can comprise network physical and/or virtual network components such as switches 110*b*, hosts 110*a*, virtual machines 110*c*, firewalls 110*d*, routers, etc. In various embodiments, the back-end application monitoring system 101 can comprise a server system 104 that comprises one or more servers. The back-end application monitoring system 101 can further comprise, or communicate with, one or more databases 108-109. Each of the one or more servers of server system 104 can be in electronic data communication with each other and/or with each of the databases 108-109.

In some embodiments, the server system 104 can be configured to generate and serve one or more digital user interfaces 500 (see FIGS. 5A and 5B) to a user device 102 via an electronic data network, e.g., a LAN, WAN, Intranet, or VPN of the organization. In some embodiments, the server system 104 is part of the computer network 103, either physically or virtually. The server system 104 can be in communication with each of the one or more network components 110*a*-110*d* of the computer network 103 via an electronic data network, such as a LAN, WAN, etc. of the organization. In some embodiments, the server system 104, as described further below, can submit data queries to the databases 108-109 and process responses to the queries to generate the digital interfaces to be served to the user device 102 that show the status information of the network components for an application.

The database 108 can store the network components in the network 103 that are used to host or run the applications of the organization. That is, based on an identifier for an application, the database 108 can be used to look up the network components that host/run the identified application. The database 109 can store status information, such as reachability status, operational data, identification data, location data, diagnostic data, etc., of the network components 110, which status information can be pulled into the database 109 or pushed into the database 109. In accordance with various embodiments, the databases 108, 109 may comprise relational databases, such as a Configuration Management Database ("CMDB"), or any other suitable database, and may be managed by any suitable relational database management system, such as SQLite. In accordance with various embodiments, the server system 104 may comprise physical servers, virtual private servers ("VPS"), cloud servers, web servers, or any other suitable server(s).

Figure 5A:
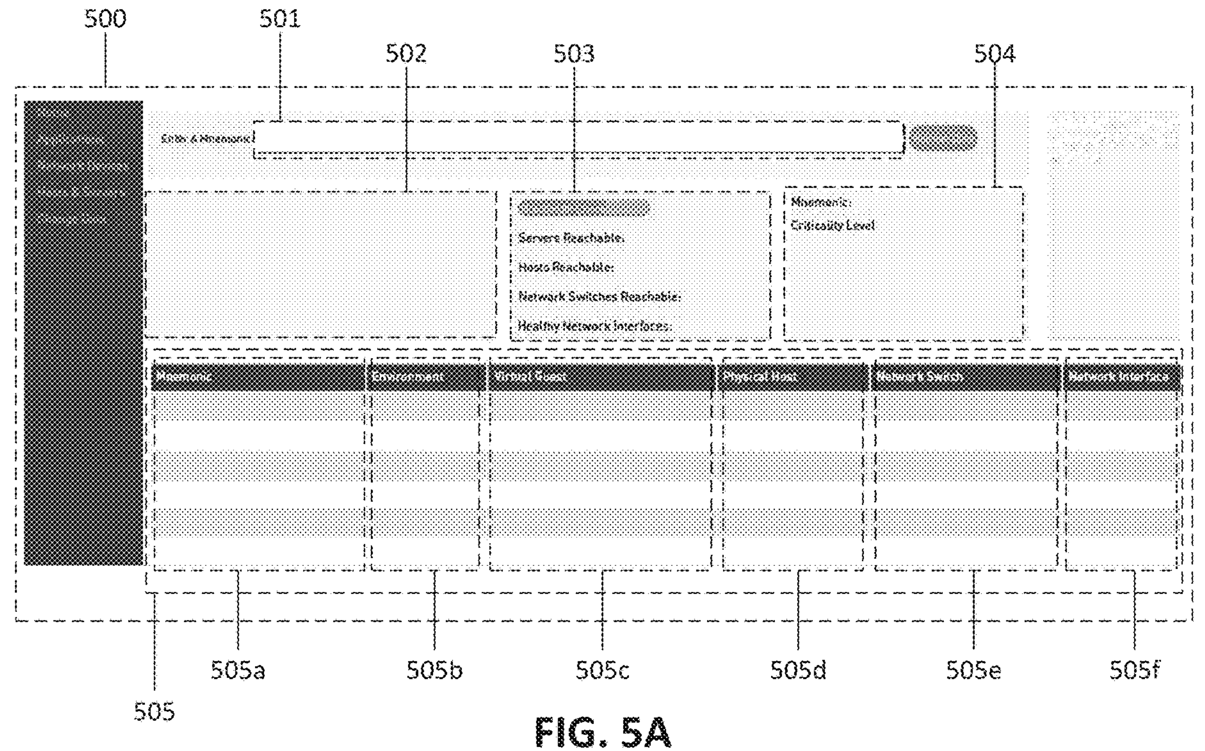
FIG. 5A illustrates a digital user interface served to user device by a system for network-focused observability, according to various embodiments of the present invention.
Figure 5B:
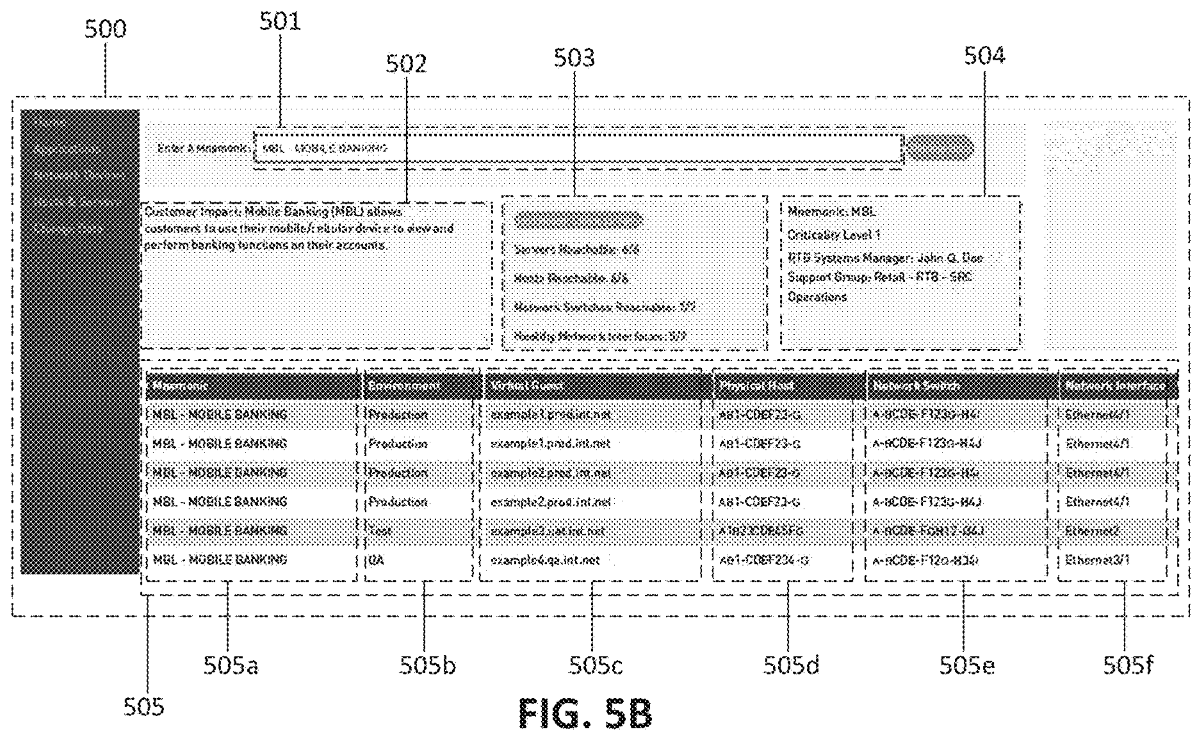
FIG. 5B illustrates a digital user interface served to user device by a system for network-focused observability, according to various embodiments of the present invention.

According to various embodiments, the server system 104 can comprise a web server (not shown), such as a Nginx web server, to process user requests from user device 102 and to generate and serve digital user interfaces, such as HTML web pages, to the user device 102. In some embodiments, the server system 104 can comprise a web server interface gateway ("WSGI") (not shown), such as a Gunicorn WSGI, to receive user requests from the web server and to forward the received user requests to a back-end monitoring application running on the server system 104. In that connection, the server system 104 can comprise a back-end monitoring application (not shown) configured to process a user request from the user device 102 that identifies an application to be monitored; read data from databases 108-109 to determine the status of the network components in the network 103 that host that application; and generate and serve digital user interfaces (e.g., web pages) that summarize the status information for the network components that support the application. An example of a digital user interface 500 that a user of the user device 102 can use to specify a particular application for monitoring is shown in FIG. 5A, and an example of a digital user interface 500 that captures and summarizes the status information for the network components for the application is shown in FIG. 5B. These user interfaces are described further below. In accordance with various embodiments, the back-end monitoring application can be further configured to communicate with the network components 110*a*-110*d*, for example, by pinging them to determine their status, with the results from the pinging being stored in the database 109. In other embodiments, as described herein, the networks components 110*a*-*d* can periodically report back their status information to the database 109 (a push scenario).

In accordance with various embodiments, the server system 104 of the back-end application monitoring system 101 can generate and serve, to a user device 102, a first digital user interface 500 (FIG. 5A) where a user may input an application identifier for a requested application from the user device 102. Upon receiving an application identifier for a requested application, the server system 104 can communicate with (i.e., query) the database 108 to retrieve identification data relating to the identity of each network component 110*a*-110*d* supporting the requested application. That is, the database 108 may comprise a look up table indexed by applications of the organization. Thus, based on the application identified in the user's request, the back-end application monitoring system 101 can look up in the database 108 the network components that host the application. The database 108 can be updated frequently enough that it is likely to include the most recent changes to the network 103. For example, for an organization where new network components 110 are likely to be added to the network 103 overnight, the database 108 can be updated daily (or every business day), or with some other frequency, or from time to time, based on the needs of the organization.

In accordance with various embodiments, identification data for a network component can include any type of identifier suitable for identifying an individual network component, such as an IP address, MAC address, name, serial number, etc. of the individual network component. Similarly, application identifiers for applications of the organization can include any type of identifier suitable for identifying an individual application, such as a full application name, an abbreviated application name, such as a mnemonic or acronym, or any other application identifier suitable for identifying an individual application. In various embodiments, the name, abbreviation, mnemonic, etc. can be independent of the vendor(s) of the application. That way, the user at the user device 102 does not need to know the vendors for the various applications, which can change over time. Instead, in various embodiments, the user at the user device 102 can merely enter a name, abbreviation, mnemonic, etc. that identifies the application without necessarily identifying the vendor.

In some embodiments, once the identification data of each network component 110*a*-110*d* supporting the requested application has been retrieved, the server system 104 can communicate with the database 109 to retrieve status information for each network component 110*a*-110*d* supporting the requested application. The status information for the network components 110 may be pulled or pushed into the database 109 according to various embodiments. For example, in a pull configuration, once the server system 104 retrieves the identification data for each network component 110*a*-110*d* supporting the requested application, the server system 104 can initiate status queries (e.g., pings) to each of network components 110*a*-110*d* hosting the requested application to retrieve and store in the database 109 operational data or other status information for each network component 110*a*-110*d* supporting the requested application. In a push configuration, the network components 110*a*-110*d* periodically, or from time to time, report their status information to the database 109. In such a configuration, the server system 104 can query the database 109 to look up the status information of the network components 110 supporting the requested application.

In a push configuration, in accordance with various embodiments, status information for each network component supporting a requested application that is stored in database 109 can be reported to database 109 by the network components 110 via telemetry streaming from each network component 110*a-d* supporting the requested application. According to various embodiments, each network component 110*a-d* of the network 103 can stream telemetry data 107, such as any type of status information, to be stored in database 109. In accordance with various embodiments, telemetry data 107 streamed from the one or more network components to the server system 104 to be stored in database 109 may be streamed via any suitable telemetry streaming protocol, such as User Datagram Protocol ("UDP"), Simple Network Management Protocol ("SNMP"), Hypertext Transfer Protocol/Hypertext Transfer Protocol Secure ("HTTP/HTTPS"), Message Queuing Telemetry Transport ("MQTT"), WebSocket protocol, etc.

According to various embodiments, the server system 104 can receive, via one or more receiver destinations, telemetry data 107 from the network components that are streamed via telemetry streaming. In some embodiments, the server system 104 can decode and store the telemetry data 107 streamed from one or more network components in the database 109. In accordance with various embodiments, the server system 104 can deploy a containerized environment 105 comprising multiple receiver containers 106*a*-106*c*, such as, for example, Docker containers, and can distribute the telemetry data 107 received from network components 110 across the multiple receiver containers 106*a*-106*c* to load balance the incoming telemetry data 107.

According to various embodiments, the server system 104 can receive, via one or more receiver destinations, telemetry data 107 from network components that is streamed via telemetry streaming. In some embodiments, the server system 104 can decode and store the telemetry data 107 streamed from one or more network components in database 109. In accordance with various embodiments, the server system 104 can deploy a containerized environment 105 comprising multiple receiver containers 106*a*-106*c*, such as, for example, Docker containers, and can distribute telemetry data 107 received from network components 110 across the multiple receiver containers 106*a*-106*c* to load balance the incoming telemetry data 107.

FIG. 2 depicts generally a pull configuration, in which the server system 104 can be configured to query (i.e., ping) one or more network components of the network components 110*a*-110*d* to obtain real-time, or near-real-time, status information for the network components 110 identified from the database look-up of database 108 for the requested application. For example, according to various embodiments, the server system 104 can ping a network component via the IP address of the network component, such as by generating and sending to the network component ping data, such as a ping packet. In accordance with various embodiments, the network component that is being pinged can respond to the server with ping data, such as a ping response packet. In accordance with various embodiments, pinging a network component can comprise any suitable method of pinging, such as Internet Control Message Protocol (ICMP) pinging, Transmission Control Protocol (TCP) pinging, User Datagram Protocol (UDP) pinging, etc. In accordance with various embodiments, ping data communicated from the server system 104 to the network components 110 and/or ping data communicated from the network components 110 to the server system 104 can be communicated across a containerized environment 105 to load balance the ping data.

In various embodiments, ICMP pinging, for example, can comprise generating, by the server system 104, an echo request packet to be transmitted by the server to one or more targeted network components, such as network components 110*a-d*, using the IP address of each targeted network component. The ICMP echo request packet can comprise data such as information about the sending server, the targeted network component's IP address, and a timestamp. If the targeted network device is active and reachable, the targeted network device will receive and process the echo request packet, and in response will generate an ICMP echo reply packet, which can contain data such as the original data from the echo request packet and a new timestamp. The echo reply packet is then transmitted back to the server system 104 containing response time data, which can comprise the length of time the network device took to return the echo reply packet.

According to various embodiments, the server system 104 can determine a reachability status of a network component based on response time data returned in an echo reply packet. For example, in some embodiments, if an ICMP response time of a network component is below a threshold, (i.e., a response time less than 100 milliseconds), the reachability status of the network component may be determined to be operative. According to various embodiments, a network component may have degrees of reachability based on varying response time thresholds. For example, a response time between a threshold range, (i.e., a response time between 100 milliseconds and 2 seconds), may result in a determination that the reachability of the network component is slow. In some embodiments, a response time above a threshold, i.e., a response time greater than 2 seconds, may result in a determination that the network component is unreachable. In various embodiments, reachability status response time thresholds may be predetermined or determined in real-time or near-real-time, and may vary based on types of network components, network implementation, network size, network configuration, etc.

In accordance with various embodiments, in a pull configuration, a reachability status of a network component determined by the server system 104 may be based on any status information that can be retrieved from the component in real-time or near-real-time and indicate a reachability status of the network component. For example, in some embodiments, the server system 104 can be configured to ping a network component using UDP pinging in order to determine the status of one or more ports of the network component. In some embodiments, UDP pinging, for example, may consist of the server system 104 sending one or more UDP packets to one or more ports (not shown) of one or more network components 110*a*-110*d*.

In accordance with various embodiments, the network components 110 of the network 103 can respond to communication from the server system 104, such as a ping, by streaming telemetry data 107, such as status information, for each of the network components 110*a*-110*d*, to be stored in database 109 in real-time or near-real-time. According to various embodiments, the server system 104 can retrieve the real-time or near-real-time telemetry data 107 from the database 109 to determine a real-time or near-real-time reachability status of each of the network components 110*a*-110*d*, and/or to serve status information for each of the network components 110*a-d* to the user device 102 via the second digital user interface 500.

The server system 104 can further determine a reachability status of each of the network components 110*a-d* based on a response, or lack thereof, from each of the network components 110*a*-110*d*. For example, in some embodiments, one or more of the network components 110*a*-110*d* may reply to a UDP ping with a specific message or acknowledgement, indicating that the one or more ports are open and active. One or more of the network components 110*a*-110*d* may not respond to a UDP ping at all, which can indicate that one or more ports are closed. However, in some embodiments, a lack of response to a UDP ping from a network device does not necessarily indicate that one or more ports being pinged are closed. For example, a firewall 110*d* of the computer network 103 may unintentionally filter or block UDP packets before they reach the one or more ports being pinged. In some embodiments, one or more of the network components 110*a*-110*d* may respond to a UDP ping with a port unreachable response, indicating that one or more ports being pinged are closed. The server system 104 can determine a reachability status of each of the one or more network components 110*a*-110*d* based on whether a number of one or more ports are open or closed, whether specific ports of the one or more ports are open or closed, or combinations thereof.

In accordance with various embodiments, the server system 104 can determine a reachability status of one or more of the network components 110*a-d* based on any status information that is retrieved from the one or more database 109, status information that is communicated to the server system 104 by the network components 110*a-d*, or any other status information that is suitable for determining a reachability status of the one or more network components. According to various embodiments, the server system 104 can determine a reachability status of a requested application. For example, the server system 104 can determine a reachability status of a requested application based on status information of the requested application, status information for one or more network components supporting the requested application, or any combination thereof.

Figure 3:
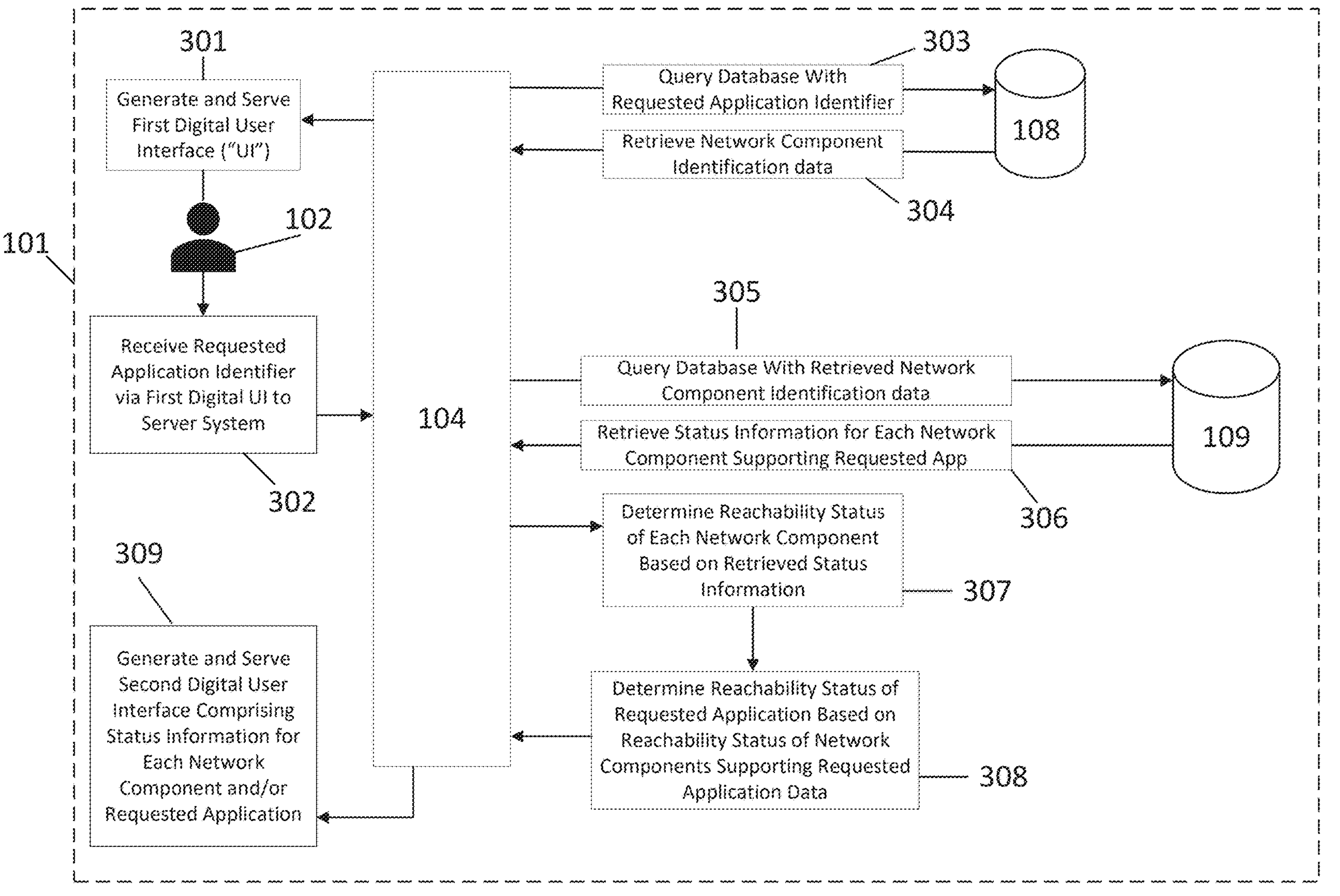
FIG. 3 illustrates a flowchart of a process flow of a method performed by a system for network-focused observability, according to various embodiments of the present invention.

FIG. 3 illustrates an operation of the back-end monitoring system 101 according to various embodiments of the present invention, in particular a push configuration for the data flow. In the illustrated example, the server system 104 generates and serves at step 301, to a user device 102, a first digital user interface, such as digital user interface 500. The server system 104 then receives at step 302 an application identifier for a requested application from the user device 102 via the first digital user interface 500 and queries at step 303 the first database 108, to retrieve at step 304 identification data for each network component supporting the requested application. The server system 104 then queries at step 305 the second database 109 to retrieve at step 306 status information for each network component supporting the requested application. In this configuration, the network components 110 periodically report their status information to the database 109. The periodicity of the reporting can vary by network component, such as depending on the criticality of the network component. For example, the network components could report their status on the order of minutes, seconds, or milliseconds, depending on the component. Based on this data, the server system 104 then determines at step 307 a reachability status of each network component supporting the requested application based on the retrieved status information.

Further to the above, the server system 104 then determines at step 308 a reachability status of the requested application based on the retrieved status information, the reachability status of one or more of the one or more components supporting the requested application, or any combination thereof. The server system 104 then generates and serves at step 309 a second digital user interface, such as digital user interface 500, to the user device 102. In accordance with various embodiments, the second digital user interface 500 served to the user device 102 can comprise any status information relating to the one or more network components supporting the requested application, any status information relating to the requested application, any status information relating to the network 103, or any combination thereof.

Figure 4:
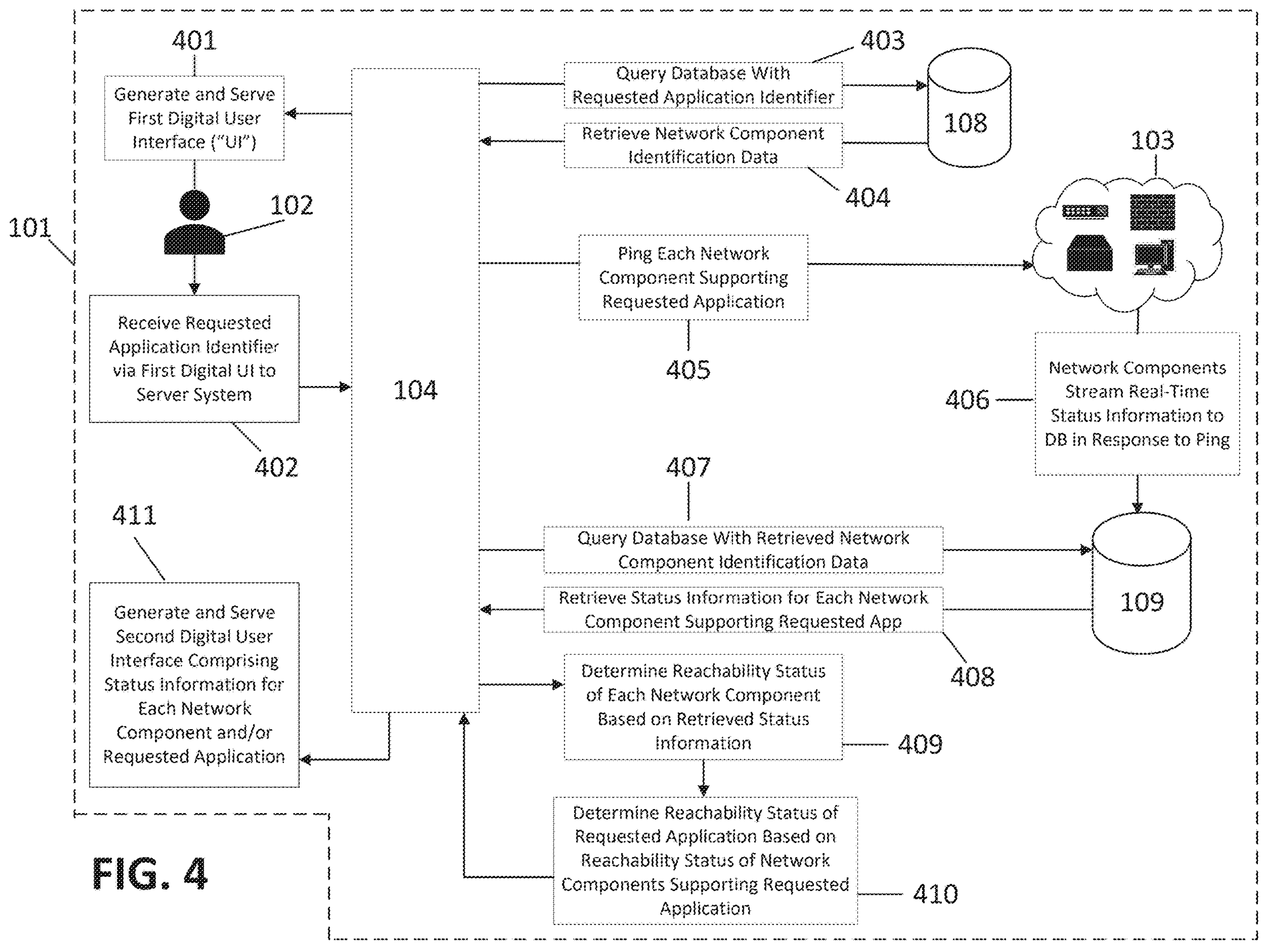
FIG. 4 illustrates a flowchart of a process flow of a method performed by a system for network-focused observability, according to various embodiments of the present invention.

FIG. 4 illustrates a pull operation according to various embodiments of the present invention. In the illustrated example, the server system 104 generates and serves at step 401, to a user device 102, a first digital user interface, such as digital user interface 500. The server system 104 then receives at step 402 an application identifier for a requested application from the user device 102 via the first digital user interface 500 and queries at step 403 a first database 108 to retrieve at step 404 identification data for each network component supporting the requested application. The server system 104 then pings at step 405 each network component that is supporting the requested application. Each network component supporting the requested application then streams at step 406 real-time status information, such as telemetry data 107, to a second database 109 to be stored in the second database 109. The server system 104 then queries at step 407 the second database to retrieve at step 408 status information for each network component supporting the requested application. The server system 104 then determines at step 409 a reachability status and/or other status-related information of each network component supporting the requested application based on the retrieved status information. In some embodiments, the server system 104 then determines at step 410 a reachability status and/or other status-related information of the requested application based on the retrieved status information, the reachability status of one or more of the one or more components supporting the requested application, or any combination thereof.

The server system 104 then generates and serves at step 411 a second digital user interface, such as digital user interface 500, to the user device 102. In accordance with various embodiments, the second digital user interface served to the user device 102 can comprise any status information relating to the one or more network components supporting the requested application, any status information relating to the requested application, any status information relating to the computer network 103, or any combination thereof.

FIG. 5A shows an example web-based user interface via which a user, at user device 102, can input an application to be monitored by the monitoring system 104. The user interface can be served by the server system 104. The digital user interface 500 can comprise a search bar 501, where a user of user device 102 can enter an application identifier for an application of the organization the user wishes to monitor. As mentioned above, the application identifier can be independent of the vendor for the application (if the application is vendor supplied application). That way, the user does not need to know the vendors for the applications, which can change over time. The digital user interface 500 can comprise one or more data fields 502, 503, 504, 505 that are updated with the information for the requested application once the server system 104 performs its monitoring function, as shown in FIG. 5B. In some embodiments, the data fields 502-505 of digital user interface 500 may contain no status information, or be otherwise empty, prior to the user entering an application identifier in the search bar 501. In some embodiments, the data fields 502-505 may contain status information from a previous search of an application identifier entered in search bar 501 by the user.

Referring now to FIG. 5B, in accordance with either the pull or push embodiments, once a user has entered an application identifier for a requested application in the search bar 501 of the digital user interface 500, and the server system 104 has retrieved status information for the requested application and the network components supporting the requested application, the server system 104 generates and serves, to the user device 102, an updated digital user interface, such as digital user interface 500 shown in FIG. 5B. As shown in the example updated digital user interface 500 of FIG. 5B, the user entered into the search field 501, or clicked on from a drop-down menu in the search field 501, the mnemonic "MBL" corresponding, in this example, to a mobile banking application for the organization. The server system updates the fields 502, 503, 504, 505 as described herein to show information about the network components for the requested application (e.g., the mobile banking application in this example). The data field 502 provides a textual summary of the requested application. The server system 104 may retrieve the textual summary from the database 108 or another database that stores textual descriptions of the organization's applications. The data field 503 shows aggregate reachability status information for the network components supporting the requested application and is discussed further below. The data field 504 provides additional information about the requested application, such as its mnemonic, an assigned criticality level for the application to the organization, the group within the organization that supports the application, and a manager for that group. This data may be stored in the database 108 as well or another database. The data field 505 shows status information for each network component supporting the requested application.

Field 505*c* lists the domain names (e.g., fully qualified domain name ("FQDN")) of the various virtual guests used to support the requested application. Field 505*d* lists IDs or names for the physical hosts hosting the virtual guests listed in field 505*c*. The formatting conventions for the IDs/names in field 505*d* can also indication a location for the physical hosts. Field 505*e* lists the MAC addresses for the network switches connected to the corresponding physical hosts in field 505*d*. Field 505*f* identifies the network interface or port for each network switch in field 505*e*, such as the Ethernet ports shown in the example of FIG. 5B. Field 505*b* identifies the environments for the virtual guests, such as production, testing, quality assurance, etc. Field 505*a* identifies the particular application, in this example "MBL" because that was the one requested according to the example. Other types and/or formats for the identifiers in fields 505*c*-*e* can be used in other embodiments, such as an IP addresses, MAC addresses, serial numbers, asset tags, or any other identifier suitable for identifying individual network components. The example of FIG. 5B shows only six rows in fields 505*a*-*f*. A particular application may require fewer or more rows, and in some embodiments, the user could scroll the rows of fields 505*a*-*f* to see additional row entries.

The data fields 505*a*-*f* can be color-coded to show status information for the network components. For example, network components that are reachable at the time of the analysis may be shown in green, whereas network components that are not reachable (and/or that do not meet a threshold for reachability) may be shown in red. Of course, in other embodiments, different manners of visually displaying the reachability status of the network components may be used. The data field 503 can show aggregate reachability status information for the network components for the requested application. As shown in the example of FIG. 5B, it can show a ratio: the number of reachable servers, hosts and network servers out of the total number of servers, hosts and network servers that are supposed to be used by the application. The data field 503 can also show the number of healthy network interfaces out of the total number of network interfaces that are supposed to be used by the application. Like data fields 505*a*-*f*, the data field 503 can be color coded. If a sufficient number or percentage of servers, hosts, and network interfaces for the application are reachable, those entries in data field 503 can be shown in green. Similarly, if a sufficient number or percentage of network interfaces are healthy, the "Healthy Network Interfaces" entry can be shown in green. Otherwise, the entries in field 503 can be shown in red. Of course, in other embodiments, other coding schemes or visual display means could be used to indicate the overall, aggregate health of the application's servers, hosts, network switches and network interfaces.

The digital user interfaces 500 of FIGS. 5A-B can comprise any suitable digital interfaces for interacting with a user device, such as HTML web pages, JavaScript web pages, CSS web pages, etc.

In the embodiments described heretofore, the user searched the status of the network components supporting an application. In other embodiments, a user at the client device 102 can use the monitoring system 104 to query the status of particular network components or groups of components. In such embodiments, a user may input network component identification data into the search bar 501 of the digital user interface 500 for a requested network component. Upon receiving identification data for the network component, the server system 104 can retrieve identification data for each of the one or more applications supported by the requested network component from the database 108 (or another database) and/or each of the other network components that interact with, communicate with, or are in any way related within the computer network 103 to the requested network component. In that connection, the database 108 may comprise a look up table indexed by network components supporting applications of the organization. For example, the database 108 may comprise a look-up table indexed by network components that contains each organization application supported by the requested network component and/or each of the one or more network component interacting with, communicating with, and/or supporting the requested network component. The server system 104 can then query database 109 to retrieve status information for each of the one or more network components interacting with, communicating with, and/or supporting the requested network component. The server system 104 may then generate and serve, to the user device 102, a digital user interface, such as digital user interface 500, containing a list of the applications supported by the requested network device and/or status-related information for each of the one or more network components interacting with, communicating with, and/or supporting the requested network component.

The system 100 may be implemented with computer devices, such as servers, with appropriately programmed software that, when executed, causes the computer devices to perform the functions described herein. The computer systems may comprise one or more processor cores and one or more computer memory units. The memory may comprise primary (memory directly accessible by the processor, such as RAM, processor registers and/or processor cache) and/or secondary (memory not directly accessible by the processor, such as ROM, flash, HDD, etc.) data storage, to store computer instruction or software to be executed by the processor core(s), such as the software for the back-end monitoring system 101.

The software for the various computer systems described herein and other computer functions described herein may be implemented in computer software using any suitable computer programming language such as .NET, C, C++, Python, and using conventional, functional, or object-oriented techniques. Examples of computer software include Nginx, Gunicorn, and Django. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer-implemented systems and methods for application-focused network observability of a computer network. In various embodiments, the system comprises a computer network comprising a plurality of network components. The plurality of network components comprises switches, hosts, and virtual machines. The system also comprises a back-end application monitoring system for monitoring a reachability status of each of one or more applications hosted by one or more of the virtual machines. The back-end application monitoring system comprises a server system comprising one or more servers configured to serve a digital user interface to a user device via an electronic network. The server system is also configured to receive an application identifier, via the digital user interface, for a requested application hosted by the one or more virtual machines.

The server system is also configured to determine a reachability status of the requested application by retrieving identification data for each component supporting the requested application from a first database, retrieving status information for each of the network component(s) supporting the requested application from a second database. Each of the network components of the computer network is configured to stream telemetry data to the second database and the second database is configured to store the streamed telemetry data. The server system is also configured to determine a reachability status of each of the network components supporting the requested application and generate and serve an updated digital user interface to the user device. The updated digital user interface comprises the retrieved status information for each network component supporting the requested application and a reachability status of each network component supporting the requested application and/or a reachability status of the requested application.

In various implementations of the systems and methods, the method comprises the step of monitoring, by a back-end application monitoring system, a reachability status for each of one or more applications hosted by a computer network. The computer network comprises a plurality of network components comprising switches, hosts, and virtual machines. The back-end monitoring application comprises a server system comprising one or more servers. The method also comprises the step of serving, by the server system, a digital user interface to a user device via an electronic network. The method also comprises the step of receiving, by the server system, an application identifier, via the digital user interface, for a requested application hosted by the one or more virtual machines.

The method also comprises the step of determining, by the server system, a reachability status of the requested application by retrieving, by the server system, identification data for each component supporting the requested application from a first database, retrieving, by the server system, status information for each of the network component(s) supporting the requested application from a second database. Each of the network components of the computer network is configured to stream telemetry data to the second database and the second database is configured to store the streamed telemetry data. The method also comprises the step of determining, by the server system, a reachability status of each of the network components supporting the requested application. The method also comprises the steps of generating and serving, by the server system, an updated digital user interface to the user device. The updated digital user interface comprises the retrieved status information for each network component supporting the requested application and a reachability status of each network component supporting the requested application and/or a reachability status of the requested application.

In various implementations of the systems and methods, the application identifier for the requested application comprises an application mnemonic.

In various implementations of the systems and methods, the first database comprises one or more tables mapping each of the network components supporting the requested to the application identifier for the requested application. The first database is updated daily.

In various implementations of the systems and methods, each network component of the plurality of network components is configured to periodically stream the telemetry data to the second database.

In various implementations of the systems and methods, the server system is configured to determine the reachability status of each of the network components supporting the requested application based on the status information retrieved from the second database.

In various implementations of the systems and methods, the status information for each of the network components supporting the requested application comprises port data for port(s) of each of the network components.

In various implementations of the systems and methods, the server system is also configured to ping each of the network components supporting the requested application in real-time. The server system pinging each of the network components causes each of the network components to stream real-time telemetry data to the second database. The server system is also configured to retrieve real-time status information for each of the network components supporting the requested application from the second database and determine a real-time reachability status of each of the network components supporting the requested application and/or the requested application.

In various implementations of the systems and methods, the pinging of each of the network components supporting the requested application comprises transmitting, by the server system, echo packets to each of the network components. In response to the pinging, each of the network components supporting the requested application streams real-time telemetry data comprising echo reply packets to the second database.

In various implementations of the systems and methods, the reachability status of each of the network components supporting the requested application is determined based on a response time contained in the echo reply packets streamed by the network components.

In various implementations of the systems and methods, the real-time reachability status of each of the network components supporting the requested application comprises one or more degrees of real-time reachability. Each of the one or more degrees of reachability is based on a different range of response times.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system comprising:

a computer network comprising a plurality of network components, wherein the network components comprise switches, hosts, and virtual machines;

a back-end application monitoring system for monitoring a reachability status for each of one or more applications hosted by one or more of the virtual machines, wherein the back-end application monitoring system comprises a server system comprising one or more servers configured to:

serve a digital user interface to a user device via an electronic network;

receive, from the user device, via the digital user interface, an application identifier for a requested application, wherein the requested application is one of the one or more applications hosted by the one or more virtual machines;

determine a reachability status of the requested application by, in part:

querying a first database, based on the application identifier, to retrieve identification data for each of one or more network components supporting the requested application, wherein the first database comprises one or more tables mapping each of the network components supporting the requested application to the application identifier for the requested application;

querying a second database, based on the retrieved identification data for each of the one or more network components supporting the requested application to retrieve status information, for each of the one or more network components supporting the requested application, wherein each of the plurality of network components is configured to stream telemetry data to the second database to be stored in the second database; and determining a reachability status of each of the one or more network components supporting the requested application; and generate, and serve to the user device, an updated digital user interface comprising:

status information for each of the one or more network components supporting the requested application; and the reachability status of each of the one or more network components supporting the requested application, a reachability status of the requested application, or any combination thereof.

2. The system of claim 1, wherein the application identifier for the requested application comprises an application mnemonic.

3. The system of claim 1, wherein the first database is updated daily.

4. The system of claim 1, wherein each of the plurality of network components is configured to periodically stream the telemetry data.

5. The system of claim 1, wherein the reachability status of each of the one or more network components supporting the requested application is determined, by the server system, based on the status information retrieved from the second database.

6. The system of claim 5, wherein the status information comprises port data for each of one or more ports of each of the one or more network components supporting the requested application.

7. The system of claim 1, wherein the server system is further configured to:

ping in real-time, in response to receiving the application identifier for the requested application from the user device, each of the one or more network components supporting the requested application to cause each of the one or more network components to stream real-time telemetry data to the second database in response to receiving the ping;

query the second database to retrieve real-time status information, for each of the one or more network components supporting the requested application; and determine a real-time reachability status of each of the one or more network components supporting the requested application, a real-time reachability status of the requested application, or any combination thereof.

8. A system, comprising:

a computer network comprising a plurality of network components, wherein the network components comprise switches, hosts, and virtual machines;

a back-end application monitoring system for monitoring a reachability status for each of one or more applications hosted by one or more of the virtual machines, wherein the back-end application monitoring system comprises a server system comprising one or more servers configured to:

serve a digital user interface to a user device via an electronic network;

receive, from the user device, via the digital user interface, an application identifier for a requested application, wherein the requested application is one of the one or more applications hosted by the one or more virtual machines;

determine a reachability status of the requested application by, in part:

querying a first database, based on the application identifier, to retrieve identification data for each of one or more network components supporting the requested application;

querying a second database, based on the retrieved identification data for each of the one or more network components supporting the requested application to retrieve status information, for each of the one or more network components supporting the requested application, wherein each of the plurality of network components is configured to stream telemetry data to the second database to be stored in the second database; and determining a reachability status of each of the one or more network components supporting the requested application; and generate, and serve to the user device, an updated digital user interface comprising:

status information for each of the one or more network components supporting the requested application;

ping in real-time, in response to receiving the application identifier for the requested application from the user device, each of the one or more network components supporting the requested application to cause each of the one or more network components to stream real-time telemetry data to the second database in response to receiving the ping;

query the second database to retrieve real-time status information, for each of the one or more network components supporting the requested application; and determine a real-time reachability status of each of the one or more network components supporting the requested application, a real-time reachability status of the requested application, or any combination thereof;

wherein pinging each of the one or more network components supporting the requested application comprises transmitting, from the server system, one or more echo request packets to each of the network components, and wherein the real-time telemetry data streamed to the second database, in response to the pinging, comprises one or more echo reply packets streamed by each of the one or more network components.

9. The system of claim 8, wherein the real-time reachability status of each of the one or more network components supporting the requested application is determined based on a response time contained in the one or more echo reply packets streamed by each of the one or more network components.

10. The system of claim 9, wherein the real-time reachability status of each of the one or more network components comprises one or more degrees of real-time reachability, and wherein each of the one or more degrees of real-time reachability is based on a different range of response times.

11. A method comprising:

monitoring, by a back-end application monitoring system, a reachability status for each of one or more applications hosted by a computer network, wherein the computer network comprises a plurality of network components, wherein the network components comprise switches, hosts, and virtual machines, and wherein the monitoring by the back-end application monitoring system comprises:

serving, by a server system, a digital user interface to a user device via an electronic network;

receiving, by the server system from the user device, via the digital user interface, an application identifier for a requested application, wherein the requested application is one of the one or more applications hosted by one or more of the virtual machines;

determining, by the server system, a reachability status of the requested application by, in part:

querying, by the server system, a first database, based on the application identifier, to retrieve identification data for each of one or more network components supporting the requested application, wherein the first database comprises one or more tables mapping each of the network components supporting the requested application to the application identifier for the requested application;

querying, by the server system, a second database, based on the retrieved identification data for each of the one or more network components supporting the requested application to retrieve status information for each of the one or more network components supporting the requested application, wherein each of the plurality of network components is configured to stream telemetry data to the second database to be stored in the second database; and determining, by the server system, a reachability status of each of the one or more network components supporting the requested application; and generating, and serving to the user device, by the server system, an updated digital user interface comprising:

status information, for each of the one or more network components supporting the requested application; and the reachability status of each of the one or more network components supporting the requested application, a reachability status of the requested application, or any combination thereof.

12. The method of claim 11, wherein the application identifier for the requested application comprises an application mnemonic.

13. The method of claim 11, wherein the first database is updated daily.

14. The method of claim 11, wherein each of the plurality of network components are configured to periodically stream the telemetry data.

15. The method of claim 11, wherein the reachability status of each of the one or more network components supporting the requested application is determined, by the server system, based on the status information retrieved from the second database.

16. The method of claim 15, wherein the status information comprises port data for each of one or more ports of each of the one or more network components supporting the requested application.

17. The method of claim 11, further comprising:

pinging in real-time, by the server system, in response to receiving the application identifier for the requested application from the user device, each of the one or more network components supporting the requested application to cause each of the one or more network components to stream real-time telemetry data to the second database in response to receiving the ping;

querying, by the server system the second database to retrieve real-time status information, for each of the one or more network components supporting the requested application; and determining, by the server system, a real-time reachability status of each of the one or more network components supporting the requested application, a real-time reachability status of the requested application, or any combination thereof.

18. A method comprising:

monitoring, by a back-end application monitoring system, a reachability status for each of one or more applications hosted by a computer network, wherein the computer network comprises a plurality of network components, wherein the network components comprise switches, hosts, and virtual machines, and wherein the monitoring by the back-end application monitoring system comprises:

serving, by a server system, a digital user interface to a user device via an electronic network;

receiving, by the server system from the user device, via the digital user interface, an application identifier for a requested application, wherein the requested application is one of the one or more applications hosted by one or more of the virtual machines;

determining, by the server system, a reachability status of the requested application by in part:

querying, by the server system, a first database, based on the application identifier, to retrieve identification data for each of one or more network components supporting the requested application;

querying, by the server system, a second database, based on the retrieved identification data for each of the one or more network components supporting the requested application to retrieve status information for each of the one or more network components supporting the requested application, wherein each of the plurality of network components is configured to stream telemetry data to the second database to be stored in the second database; and determining, by the server system, a reachability status of each of the one or more network components supporting the requested application; and generating, and serving to the user device, by the server system, an updated digital user interface comprising:

status information, for each of the one or more network components supporting the requested application; and the reachability status of each of the one or more network components supporting the requested application, a reachability status of the requested application, or any combination thereof;

pinging in real-time, by the server system, in response to receiving the application identifier for the requested application from the user device, each of the one or more network components supporting the requested application to cause each of the one or more network components to stream real-time telemetry data to the second database in response to receiving the ping;

querying, by the server system the second database to retrieve real-time status information, for each of the one or more network components supporting the requested application; and determining, by the server system, a real-time reachability status of each of the one or more network components supporting the requested application, a real-time reachability status of the requested application, or any combination thereof;

wherein the pinging each of the one or more network components supporting the requested application comprises transmitting, from the server system, one or more echo request packets to each of the network components, and wherein the real-time telemetry data streamed to the second database in response to the pinging comprises one or more echo reply packets streamed by each of the one or more network components.

19. The method of claim 18, wherein the real-time reachability status of each of the one or more network components supporting the requested application is determined based on a response time contained in the one or more echo reply packets streamed by each of the one or more network components.

20. The method of claim 19, wherein the real-time reachability status of each of the one or more network components comprises one or more degrees of real-time reachability, and wherein each of the one or more degrees of real-time reachability is based on a different range of response times.

* * * * *